United States Patent [19]

Richmond

[11] Patent Number: 4,728,953
[45] Date of Patent: Mar. 1, 1988

[54] CLOSED LOOP CONTROL OF RECEIVER TURN-ON TO INCREASE RADAR SENSITIVITY

[75] Inventor: Carl T. Richmond, Scottsdale, Ariz.

[73] Assignee: Motorola, Inc., Schaumburg, Ill.

[21] Appl. No.: 914,956

[22] Filed: Oct. 3, 1986

[51] Int. Cl.⁴ .............................................. G01S 7/34
[52] U.S. Cl. ...................................... 342/91; 342/205
[58] Field of Search .................... 342/89, 91, 92, 94, 342/120, 198, 202, 203, 205; 367/97, 98

[56] References Cited

U.S. PATENT DOCUMENTS 2,476,409  7/1949  Free .................................. 342/91 X
2,738,503  3/1956  Allen ............................... 342/205 X
3,309,703  3/1967  Ammon et al. ................. 342/120 X
3,781,772  12/1973  Inoue et al. ......................... 367/97 X Primary Examiner—T. H. Tubbesing
Assistant Examiner—Gilberto Barrón, Jr.
Attorney, Agent, or Firm—Maurice J. Jones, Jr.

[57] ABSTRACT

A radar system includes a variable delay circuit coupled between the transmitter and the receiver switch. A feedback loop including a comparator and an integrator is coupled between the receiver envelope detector and a control terminal for the variable delay circuit. The feedback loop controls the amount of delay of the receiver switch to maximize sensitivity to close range targets.

8 Claims, 6 Drawing Figures

CLOSED LOOP CONTROL OF RECEIVER TURN-ON TO INCREASE RADAR SENSITIVITY

STATEMENT OF GOVERNMENT INTEREST:

This invention was made with Government support under N60530-84-D-0190 awarded by the Department of the Navy. The Government has certain rights in this invention.

BACKGROUND OF THE INVENTION

This invention relates generally to pulsed radar systems. Specifically, the present invention relates to alleviating the transmitter leakage into the receiver in a manner to optimize the radar sensitivity to targets at close ranges.

Radars are sometimes required to detect targets at very close ranges. A major source of interference in the close range detection process is the self-generated interference from the signal sent by radar transmitter. Because the isolation between the transmitter and receiver is finite, a portion of the instantaneous transmitted signal tends to enter or leak into the receiver.

In a non-coherent pulse radar, this "leakage" signal is rejected by receiver switch circuitry that keeps the receiver input signal path switched off during some portion of the transmitted signal but which hopefully switches this path on in time for the receiver to receive the reflected signal from the target. The time between the transmitted signal and the reflected signal decreases as the target and the radar come closer together. Accordingly, as the radar and the target come closer together a distance will be reached between them where the leading edge of the reflected signal will overlap the trailing edge of the leakage signal. Under these conditions, the receiver switch must attenuate the leakage signal enough to prevent its false detection as a target but this action also tends to attenuate close range reflected target signals since these overlap part of the leakage signal. Timing of the receiver switch turn-on therefore is critical for stable, maximum sensitivity to targets at close range.

Prior art radar systems, which will be described in more detail in a subsequent part of this specification, generally enable the receiver input path to become conductive at a fixed, predetermined time after the transmitted pulse is sent. This fixed turn-on delay is chosen for worst case conditions to assure that the leakage signal will not be mistaken as a target. Such designs based on worst case parameters unfortunately result in the radar sensitivity to close range targets being lower than it could potentially otherwise be when the actual parameters are not worst case.

SUMMARY OF THE INVENTION

Accordingly, it is an object of the present invention to provide improved radar systems.

Another object of one aspect of the present invention concerns providing improved radar systems with optimized sensitivity to close range targets.

Yet another object of another aspect of the present invention concerns providing improved radar systems which have maximized sensitivity to close range targets that can be sustained for predetermined periods of time.

The above and other objects and advantages of the present invention are achieved by utilizing a variable delay circuit coupled between the radar transmitter and the control terminal of a switch circuit for the radar receiver. A feedback loop for controlling the variable delay circuit is coupled between the output terminal of the radar envelope detector and a control terminal of the variable delay circuit. The feedback loop includes a leakage signal comparator and a loop integrator. One input terminal of the leakage signal comparator is coupled to receive a reference signal which has a magnitude that is a fixed amount below the threshold voltage for the radar target detector and another input terminal is connected to receive the detected leakage signal. The leakage signal comparator and the integrator utilize the leakage signal to provide a control signal for controlling the amount of delay provided by the variable delay circuit. As a result, the amount of delay between the transmitted signal and the receiver turn-on is optimized to allow the receiver to have maximum sensitivity to the reflected target signal while preventing the receiver from falsely interpreting the leakage signal from the transmitter as being a target.

Furthermore, another embodiment of the present invention, utilizes additional circuitry to sustain target detection for a time period that is significant compared to the feedback loop response time. This additional circuitry includes an equlibrium detector having an input terminal coupled to the radar target detection circuitry and having an output terminal connected to a switch inserted in the feedback loop for the variable delay circuit. Thus, after target detection equilibrium is established, detection of the output signal of the target comparator is utilized to open the feedback loop and hold the receiver switch turn-on delay constant at some present value to sustain the target detection.

BRIEF DESCRIPTION OF THE DRAWINGS

A more complete understanding of the present invention may be derived by reference to the detailed description and the claims when considered in connection with the accompanying drawings wherein like reference numbers designate similar parts:

PRIOR ART

Figure 1:
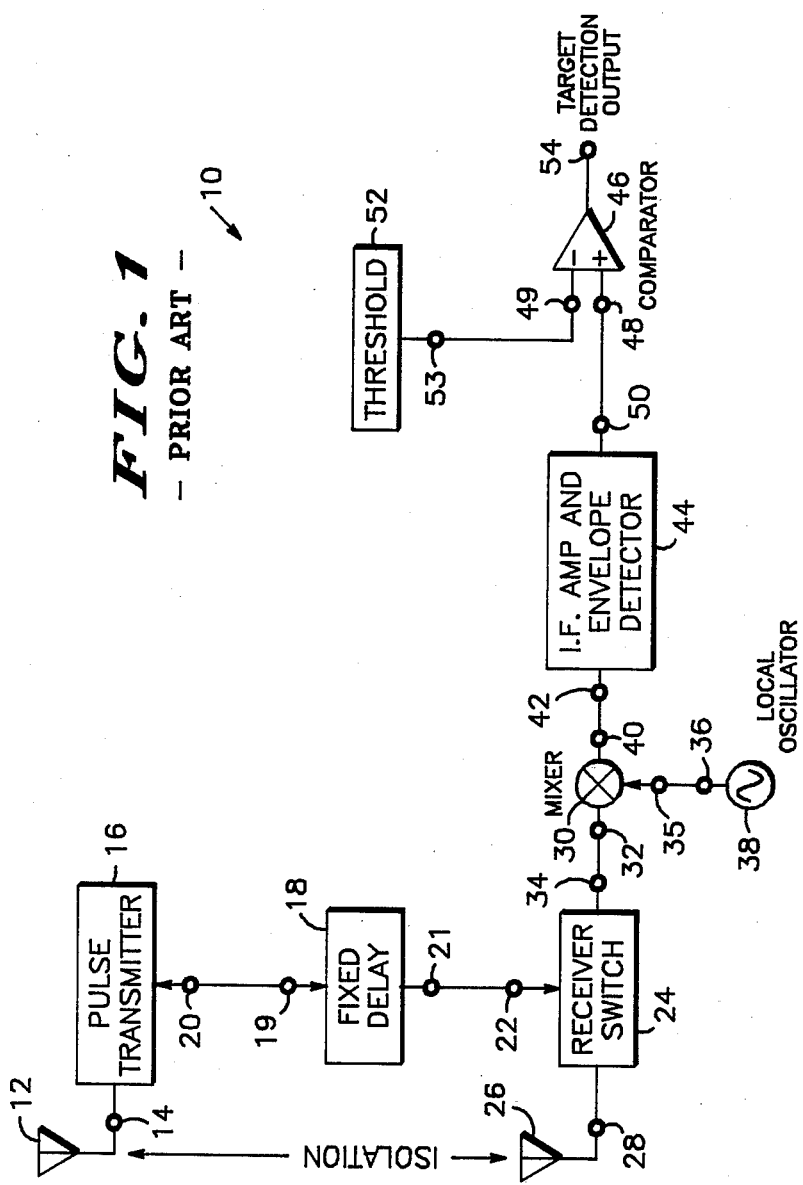
FIG. 1 is a block diagram of a portion of a prior art radar system.

A block diagram of a portion of prior art noncoherent radar system 10 is illustrated in FIG. 1. Transmitter antenna 12 is connected to output terminal 14 of pulse transmitter 16. Fixed delay circuit 18 has input terminal 19 connected to receive signals from terminal 20 of pulse transmitter 16 and output terminal 21 connected to control terminal 22 of normally non-conductive receiver switch 24 which is located in the receiver input signal path. Receiver antenna 26 is connected to input terminal 28 of receiver switch 24. Mixer 30 has first input terminal 32 connected to output terminal 34 of receiver switch 24 and second input terminal 35 connected to output terminal 36 of local oscillator 38. Output terminal 40 of mixer 30 is coupled to input terminal 42 of intermediate frequency (IF) amplifier and envelope detector circuit 44. Target threshold comparator 46 has first input terminal 48 connected to output terminal 50 of IF amplifier and envelope detector 44 and second input terminal 49 connected to receive a threshold voltage of constant magnitude from target threshold supply 52 output terminal 53. Output terminal 54 of target threshold comparator 46 provides a target detection signal for processing by other radar circuitry connected thereto in a known manner.

Figure 2A:
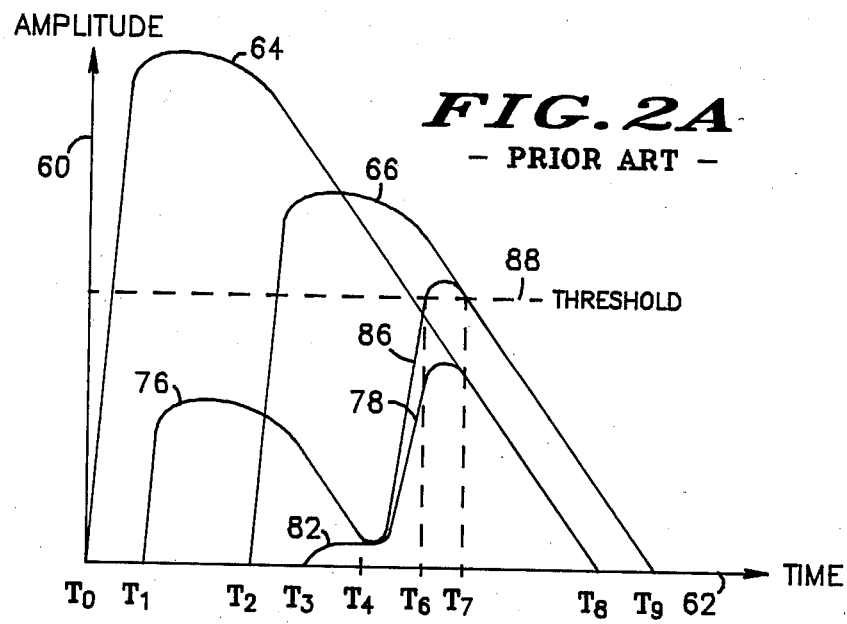
FIG. 2A is a timing diagram illustrating the amplitude of overlapping leakage and target pulses before and after the receiver switch is activated.

FIG. 2 illustrates the operation of the prior art circuitry 10 shown in FIG. 1. FIG. 2A includes a vertical axis 60 indicating signal amplitude and a horizontal axis 62 indicating time. Pulse transmitter 16 transmits electromagnetic energy through antenna 12. Because the isolation between transmitter antenna 12 and receiver antenna 26 is of some finite value due to the proximity of their locations, the transmitted signal induces a simultaneous, undesirable leakage signal in receiver antenna 26 which is applied to input terminal 28 of receiver switch 24. If it is assumed that receiver switch 24 provides no attenuation then the undesired leakage signal would be also applied through switch output terminal 34 to input terminal 32 of mixer 30. After being mixed with the signal from local oscillator 38, amplified by IF amplifier and then detected, the envelope of the leakage signal is applied to output terminal 50. The envelope of an unattenuated, detected leakage signal is illustrated by waveform 64 of FIG. 2A.

The transmitted signal will be reflected off of a target to form a reflected target pulse having an unattenuated, detected envelope shown as waveform 66 of FIG. 2A. The difference in time duration between times $T_0$ form and $T_2$ is directly proportional to the distance between the transmitter and the target. Hence, the closer the target is to the transmitter the shorter will be the duration between the leading edges of the transmitted pulse and the received target pulse and hence the greater the overlap of these pulses.

Figure 2B:
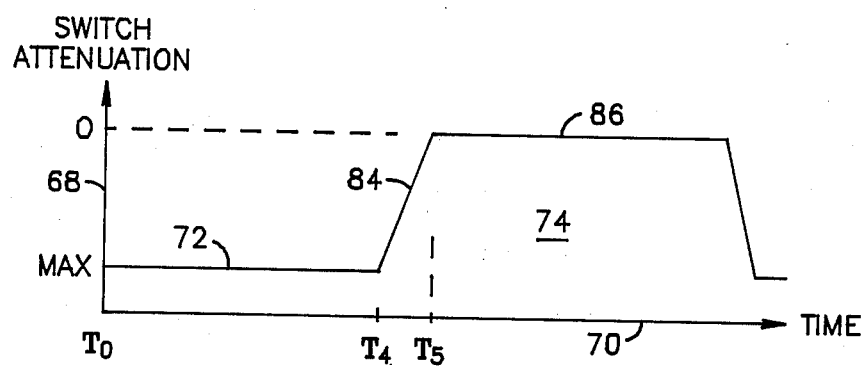
FIG. 2B illustrates the attenuation characteristic of the receiver switch corresponding to FIG. 2A.

FIG. 2B illustrates the attenuation characteristic provided by receiver switch 24. Attenuation is indicated along vertical axis 68 and time along horizontal axis 70. Between time $T_0$, when the transmitted pulse and hence leakage pulse 64 begin, and time $T_4$, receiver switch 24 provides maximum attenuation as indicated by portion 72 of receive switch attenuation characteristic 74. As a result, the magnitude of attenuated leakage envelope 78 occurring at video detector output terminal 50 is reduced as indicated by portion 76 of waveform 78. Furthermore, the amplitude of attenuate target pulse envelope 80 at detector output terminal 50 is also reduced between times $T_0$ and $T_4$ as indicated by portion 82 relative to the unattenuated magnitude of target envelope 66 at time $T_4$.

Switch 24 self-activates a fixed time $T_4$ after the transmitted pulse is initiated in a known manner in response to a control signal from delay circuit 18 which is itself activated by transmitter 16 simultaneously with the initiation of the transmitter pulse in a known manner. At time $T_4$ switch 24 reduces the amount of attenuation provided as indicated by portion 84 of characteristic 74 in FIG. 2B. As a result, the target and leakage envelopes 78, 80 both begin increasing at time $T_4$ as respectively indicated by waveform portions 86 and 88 of FIG. 2A. At time $T_5$ receiver switch 24 provides virtually no attenuation and thus the magnitudes of the envelopes of target signal 80 and leakage signal 78 correspond exactly with unattenuated envelopes 66 and 64, respectively.

Threshold level 88 of FIG. 2A indicates the magnitude of the target threshold voltage applied to input terminal 49 of target threshold comparator 46. Target comparator 46 compares the magnitude of the signals applied at input terminal 48 thereof to the target threshold signal applied to terminal 49 thereof to provide an output signal at terminal 54 only when the magnitude of the signal on input terminal 48 exceeds threshold level 88. Thus, between times $T_6$ and $T_7$ of FIG. 2A when target envelope signal 80 exceeds threshold 88, a target detector signal is supplied at output terminal 54 of target threshold comparator 46. This target detection signal is applied to target signal processing circuitry coupled to output terminal 54 which among other functions compares the timing of the target signal to the time of the transmitted signal to compute the distance of the target from the transmitter in a known manner.

Hence, receiver switch 24 hopefully attenuates the amplitude of receiver leakage signal 78 enough to keep it from rising above threshold 88 and being falsely detected as a target. The timing of the turn-on of switch 24 at time $T_4$ is critical for stable, maximum sensitivity at close range. Turn on time $T_4$ is arranged to be a fixed amount later than time $T_0$ when transmitted pulse is initiated. A receiver turn-on control signal at terminal 20 of transmitter 16 is delayed a constant amount by fixed delay circuit 18 to provide this result. The leakage signal amplitude 64 at input terminal 28 of switch 24 is well above the detection threshold 88 for minimum target signal. However, the turn-on of switch 24 at time $T_4$ is delayed until the trailing edge of the envelope of the input leakage pulse 64 has fallen safely below threshold 88. Thus, switch 24 operates to keep the magnitude of the attenuated envelope 78 of the leakage signal safely below threshold 88 for the full duration of the leakage pulse.

As indicated in FIG. 2A, time $T_4$ of receiver switch turn-on occurs close in time to the occurrence of the peak amplitude of target pulse 66. As a result, target pulse 80 exceeds detection threshold 88 even though the peak amplitude at input terminal 28 to switch 24 as indicated by waveform 66 is lower than the leakage pulse at the switch input terminal 28 as indicated by waveform 64. However, if the switch turn-on delay were slightly longer or the target delay were slightly shorter, illustrated target signal 80 would not exceed the detection threshold 88 and the target would not be detected.

If the switch turn-on delay were reduced, the target signal amplitude at the input to switch 24 could be reduced and still produce a crossing of threshold 88 thus resulting in the sensitivity of radar 10 to target signals being increased at a given range. However, since the transmitter to receiver isolation, transmitted pulse shape and switch turn-on delay can vary with changes in environment, the fixed turn-on delay for prior art system 10 shown in FIG. 1 must be adjusted for worst case conditions thereby making the delay longer than necessary when these parameters are not worst case to assure that leakage will not be detected. This causes the close range target sensitivity to be lower than it could potentially be when the parameters are not worst case. Hence, prior art system 10 shown in FIG. 1 suffers from a serious problem of having insufficient sensitivity for some applications involving close range targets.

DETAILED DESCRIPTION OF THE PREFERRED EMBODIMENTS

Figure 3:
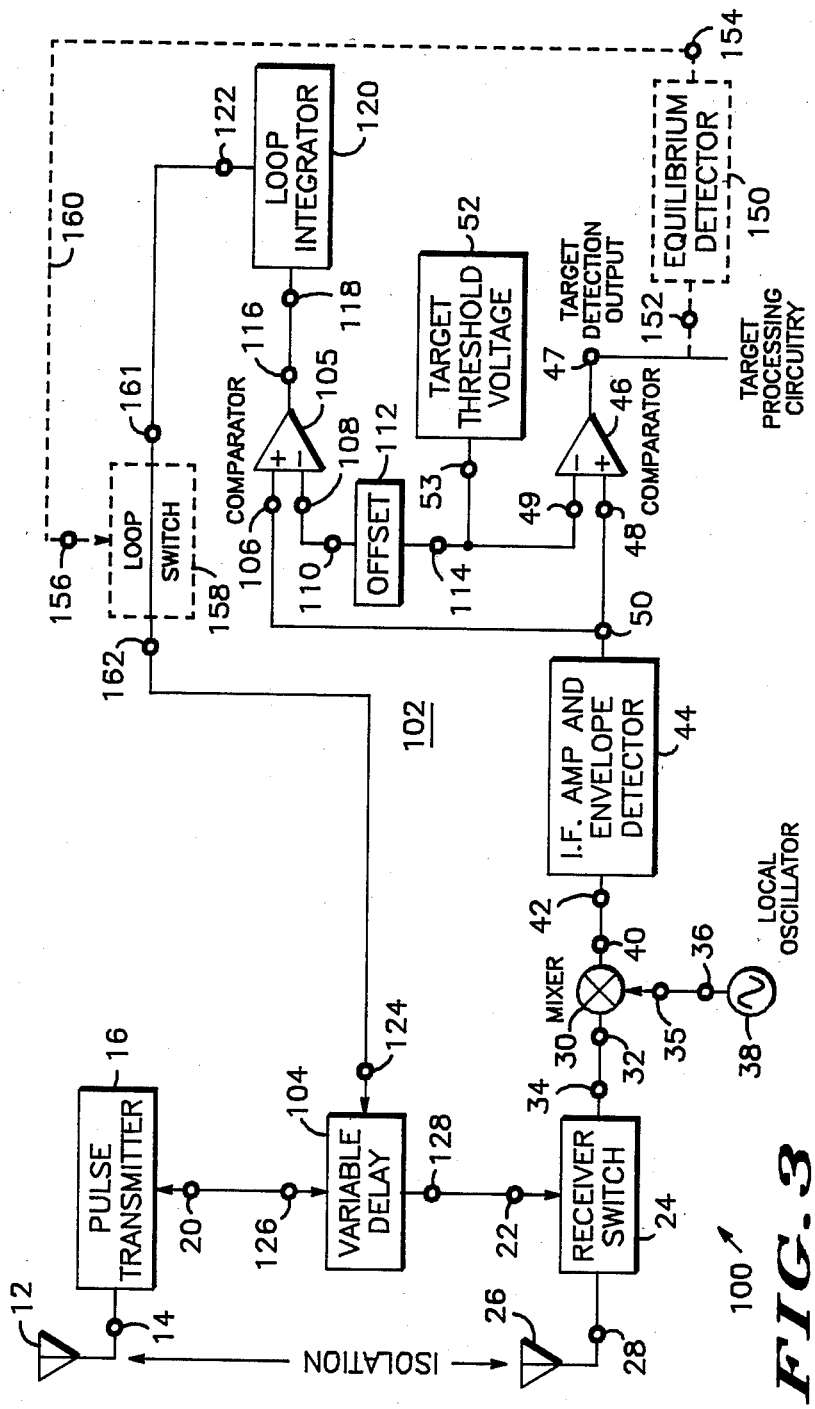
FIG. 3 is a modified block diagram showing a feedback loop in accordance with an embodiment of the invention.

FIG. 3 shows a block diagram of front end circuitry 100 of a non-coherent radar system which is modified in accordance with the invention by the addition of delay control feedback loop 102 and variable delay circuit 104. More specifically, delay control feedback loop 102 includes leakage comparator 105 having first input terminal 106 connected to output terminal 50 of IF amplifier and envelope detector 44. Leakage comparator 105 can be an integrated circuit of known design. Second input terminal 108 of leakage comparator 105 is connected to output terminal 110 of offset circuit 112, which also can be a circuit of known design. Input terminal 114 of offset circuit 112 is connected to output terminal 53 of target threshold voltage supply circuit 52. As a result, a leakage reference voltage is applied to comparator terminal 108 which has a predetermined constant magnitude which is shifted or offset with respect to the voltage of constant magnitude provided by target threshold circuit 52.

Output terminal 116 of leakage comparator 105 is connected to input terminal 118 of loop integrator 120, which can be realized in a known manner by employing either an operational amplifier integrated circuit or a low pass filter. Output terminal 122 of loop integrator 120 is connected to control terminal 124 of variable delay circuit 104 which can be implemented by a varactor controlled, one shot multivibrator circuit of known design, for instance. Input terminal 126 of variable delay circuit 104 is coupled to control output terminal 20 of pulse transmitter 16 for receiving control signals indicating the initiation of the transmitted pulse and output terminal 128 of variable delay circuit 104 is connected to control terminal 22 of receiver switch 24.

The timing trigger at terminal 20 provided from pulse transmitter 16 which can be simultaneous with the leading edge of the transmitted pulse, is selectively delayed by variable delay circuit 104 to provide a signal at output terminal 128 for selectively rendering receiver switch 24 conductive as in prior art system 10, but the amount of delay is now variable under control of control signals from feedback loop 102. The detected envelope of the leakage signal or video is applied to target comparator input terminal 48 as in the prior art embodiment but this envelope is also applied to input terminal 106 of leakage comparator 105. The offset of the threshold voltage for leakage comparator 105 with respect to the target threshold voltage causes the leakage threshold voltage to be a fixed amount below the target threshold 88.

Figure 4A:
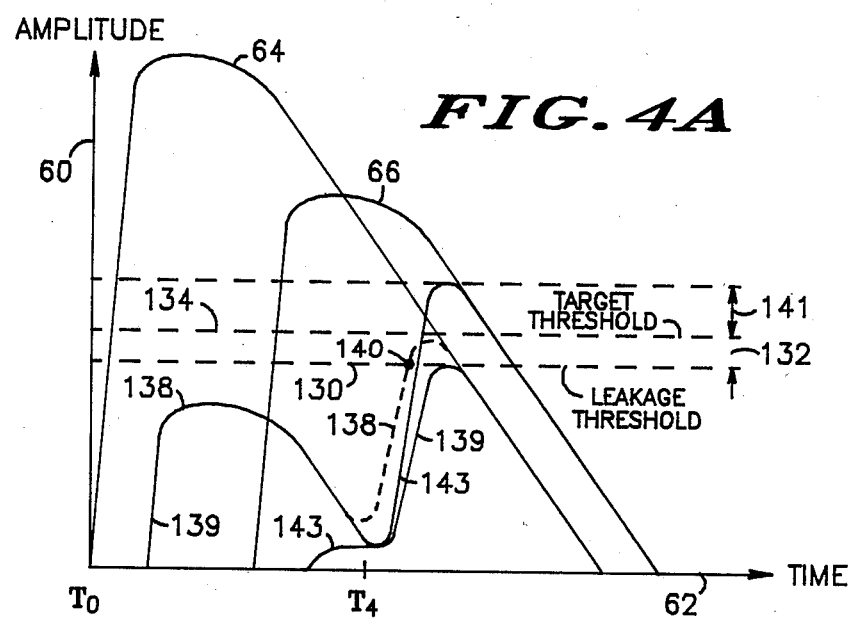
FIG. 4A is a timing diagram illustrating the operation of the feedback loop FIG. 3.
Figure 4B:
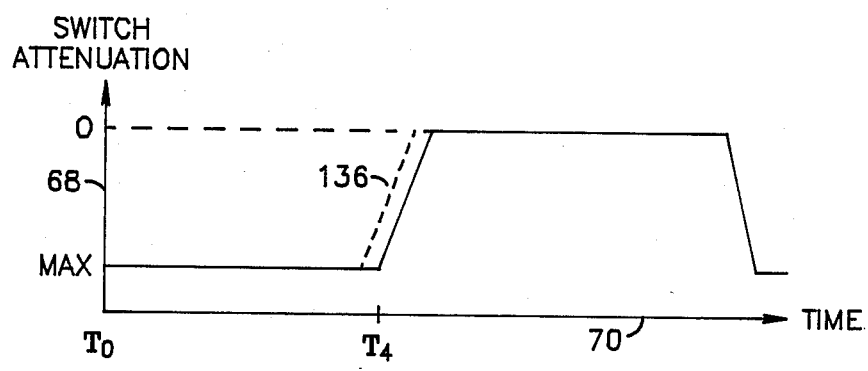
FIG. 4B illustrates the attenuation characteristic of the receiver switch corresponding to FIG. 4A.

The waveforms of FIG. 4A and FIG. 4B generally illustrate the operation of the embodiment of the invention shown in FIG. 3. Waveforms 64 and 66 of FIG. 4 are identical to the waveforms previously described with respect to FIG. 2. In addition, FIG. 4A illustrates leakage reference threshold level 130 which is offset by a fixed amount 132 below target threshold 134. The circuitry of this embodiment of the invention enables target reference threshold level 134 to be lower than target threshold 88 of FIG. 2A when parameters are not worst case thereby increasing the sensitivity of the radar receiver circuit to close targets.

If the turn-on delay of receiver switch 24, when measured from to the initiation of the leakage voltage at time $T_0$, is too short as illustrated by dashed line 136 of FIG. 4B, leakage pulse 64 will cross or exceed the magnitude of the leakage threshold 130 to produce output signals from leakage comparator 105 as indicated by dashed line 138 crossing leakage threshold 130 at point 140. These leakage comparator output signals will be integrated by loop integrator 120 to produce a feedback delay control signal of increasing magnitude at control terminal 124 of variable delay circuit 104. This increasing feedback control signal controls circuit 104 to cause the delay between the turn-on of receiver switch 24 and the initiation of leakage pulse 64 to be increased until the amplitude of the leakage pulses are attenuated below leakage threshold 130, as indicated by wave form 139.

Conversely, if the switch turn-on delay is too long, which will be the case under start up conditions for the radar circuitry, then no output leakage pulses are produced at output terminal 116 of leakage comparator 105 and loop integrator 120 then provides a feedback control signal of decreasing magnitude to provide a delay control signal of decreasing magnitude. In response, the delay provided by circuit 104 decreases until the increased leakage attenuation provided by receiver switch 24 forces the leakage envelope to again cross leakage threshold 130 of FIG. 4A.

At equilibrium, feedback loop 100 sets the delay between the initiation of the leakage threshold voltage at $T_0$ and the turn-on of receiver switch 24 at time $T_4$ so that the leakage envelope amplitude is held to just under leakage threshold 130 as indicated by the amplitude of leakage voltage 139 of FIG. 4A. Offset 132 between the leakage threshold 130 and target threshold 134 assures a specific margin of safety against false detection of leakage as a target by target comparator 46. Close range sensitivity to targets is maximized because the turn-on delay of switch 24 is automatically adjusted based on leakage signal amplitude, shape and target delay, to a minimum but still provides the required safety margin against detecting leakage pulses as targets. Accordingly, the amplitude of the detected target pulse 143 as indicated by distance 141 of FIG. 4A is maximized thereby maximizing the close range sensitivity of the radar to close targets.

A target pulse with enough amplitude to cross target threshold 134 will also cross leakage threshold 130. Accordingly, circuitry must be provided to prevent the leakage threshold crossing by the target signal from causing the switch delay to undesirably increase thereby causing unnecessary attenuation of the target signal. Loop integrator 120 of FIG. 3 serves this function for applications where the target signal appears abruptly and where detection thereof need not be maintained for a very long time period compared to the response time of loop 102. Integrator 120 slows the response time of loop 102 so that no significant change in the turn-on delay occurs for applications where only short target detection times are required. Integrator 120 allows the loop response to track slow changes in leakage amplitude, pulse delay or turn-on delay characteristic.

If target detection must be maintained for a time period that is significant compared to the allowable response time of loop 102, then additional circuitry shown in dashed form in FIG. 3 can be employed. More specifically, FIG. 3 illustrates equilibrium detector 150 having input terminal 152 coupled to the output terminal 47 of target comparator 46. Output terminal 154 of equilibrium detector 150 is coupled to control terminal 156 of loop switch 158 by conductor 160. Loop switch 158 also has input terminal 161 connected to output terminal 122 of loop integrator 120. Output terminal 162 of loop switch 158 is connected via conductor 164 to control terminal 124 of variable delay circuit 104. When target acquisition equilibrium is established at output terminal 47 of target comparator 46, equilibrium detector 150 provides a control signal to normally closed loop switch 158 which then opens feedback loop 102 which operation holds the turn-on delay of receiver switch 24 constant at its then present value.

Hence, the above described embodiments of the invention allow radar systems to automatically adapt to parameter changes in response to transmitter leakage so that maximum near range target sensitivity is optimized for a predetermined period of time.

While the invention has been particularly shown and described with reference to preferred embodiments, those skilled in the art will understand that changes in form and details may occur therein without departing from the scope of the present invention.

I claim:

1. A radar system including in combination:
   transmitter means for transmitting electromagnetic energy to be reflected by a target to provide a target signal;
   receiver means for detecting the presence of said target signal but tending to be undesirably affected by a leakage signal induced therein by said electromagnetic energy;
   receiver switch means coupled to the receiver and adapted to selectively attenuate said leakage signal;
   variable delay means coupled between said transmitter means and said receiver switch means for providing first control signals to said receiver switch means which selectively activate said receiver switch means in response to said leakage signal;
   envelope detecting means for detecting the envelopes of said leakage signal and said target signal;
   feedback means coupled between said envelope detecting means and said variable delay means, said feedback means providing second control signals for varying the timing of said first control signals relative to the initiation of said leakage signals;
   target detecting means having target comparator means for comparing the magnitude of signals applied to first and second input terminals thereof, said first input terminal of said target comparator means being coupled to said envelope detecting means; and
   target threshold supply having an output terminal for providing a target reference voltage to said second input terminal of said target comparator means.

2. The radar system as claimed in claim 1 wherein said feedback means includes:
   offset circuit means having an input terminal and an output terminal, said input terminal of said offset circuit means being coupled to said target threshold supply, said offset circuit means providing a leakage reference voltage at said output terminal thereof having a magnitude which is a function of the magnitude of said target reference voltage;
   leakage comparator means having first and second input terminals and an output terminal, said first input terminal of said leakage comparator means being coupled to said output terminal of said offset circuit means for receiving said leakage reference voltage, said second input terminal of said leakage comparator means being coupled to said envelope detecting means;
   circuit means coupling said output terminal of said leakage comparator means to said variable delay means; and
   said leakage comparator means and said circuit means providing said second control signals to said variable delay means in response to said envelope of said leakage signal exceeding said leakage reference voltage, said second control signal determining the amount of delay provided by said variable means.

3. The radar system of claim 1 wherein said circuit means includes integrator means.

4. A radar system for identifying targets at close range, the radar system having:
   transmitter means for transmitting electromagnetic energy;
   receiver means with an input signal path which necessarily develops undesireable leakage signals in response to said transmitted electromagnetic energy and which also receives reflected target signals that tend to overlap said undesirable leakage signals;
   receiver switch means for selectively attenuating said undesirable leakage signals;
   variable delay means coupled between said transmitter means and said receiver means, said variable delay means providing a precisely controlled delay of a switch signal provided in response to said transmitted electromagnetic energy to selectively render said receiver switch means more conductive so that said reflected target signals will be conducted by said receiver switch means and said leakage signals will be attenuated;
   envelope detecting means for detecting the envelopes of said leakage signal and said reflected target signal;
   leakage comparator means having a first input terminal coupled to said envelope detecting means and adapted to receive said envelope of said leakage signal and a second input terminal adapted to receive a leakage threshold voltage, said leakage comparator providing delay control signals which are a function of the magnitude of said envelope of said leakage signal; and
   circuit means coupling said leakage comparator means to said variable delay means, said variable delay means being responsive to said delay control signals from said leakage comparator means to vary the amount of delay of said switch control signals relative to said transmitted signal to thereby optimize the sensitivity of the radar system to targets close to the radar.

5. The radar system of claim 4 wherein said circuit means includes an integrator means.

6. The radar system of claim 4 further including:
   offset circuit means having an input terminal and an output terminal, said output terminal of said offset circuit means being coupled to said second input terminal of said leakage comparator means;
   target threshold voltage supply means having an output terminal coupled to said input terminal of said offset circuit means, said target threshold voltage supply providing a target threshold voltage of constant magnitude; and
   said offset circuit means providing a leakage threshold voltage level of constant magnitude which has a predetermined offset with respect to said constant magnitude of said target threshold voltage.

7. The radar system of claim 6 where said magnitude of said leakage threshold voltage is a predetermined amount less than said magnitude of said target threshold voltage.

8. The radar system of claim 4 further including:

target detection means having an input terminal coupled to said envelope detecting means and an output terminal;

target equilibrium detector means having an input terminal coupled to said output terminal of said target detection means and an output terminal; and loop switch means coupled between said variable delay means and said leakage comparator means for sustaining target detection in response to signals from said equilibrium detector means.

* * * * *